United States Patent [19]

Matsumoto et al.

[11] 4,104,651
[45] Aug. 1, 1978

[54] FOCUSING SCREEN UNIT FOR SINGLE LENS REFLEX CAMERA

[75] Inventors: Seiichi Matsumoto; Mutsuhide Matsuda, both of Yokohama; Hideo Yokota, Tokyo, all of Japan

[73] Assignee: Canon Kabushiki Kaisha, Tokyo, Japan

[21] Appl. No.: 768,417

[22] Filed: Feb. 14, 1977

[30] Foreign Application Priority Data

Feb. 17, 1976 [JP] Japan .................................. 51-16297

[51] Int. Cl.² .......................... G03B 7/08; G03B 17/20
[52] U.S. Cl. ........................................ 354/25; 354/31; 354/54; 354/201
[58] Field of Search ....................... 354/25, 31, 53–56, 354/59, 200, 201; 355/55, 56; 352/140; 356/125, 126; 250/201, 204

[56] References Cited

U.S. PATENT DOCUMENTS

| 3,175,457 | 3/1965 | Papke et al. | 354/55 |
| 3,710,699 | 1/1973 | Mitani | 354/59 |
| 4,019,049 | 4/1977 | Schulz | 354/25 |

Primary Examiner—L. T. Hix
Assistant Examiner—William B. Perkey
Attorney, Agent, or Firm—Toren, McGeady and Stanger

[57] ABSTRACT

In an automatic focusing screen unit transparent photoelectric transducing means at a central portion of the image receiving surface area of a glass plate are capable of generating an output signal commensurate with the sharpness of an image formed thereon by an objective lens of a camera. An electrical circuit for processing the output signal of the transducing means produces an output during sharp focus. In a preferred embodiment, this circuit is constructed in the form of an integrated circuit chip for incorporation in the unit together with indicating means responsive to the output signal of the circuit for indicating a sharp focus condition.

32 Claims, 24 Drawing Figures

FOCUSING SCREEN UNIT FOR SINGLE LENS REFLEX CAMERA

BACKGROUND OF THE INVENTION

1. Field of the Invention

This invention relates to single lens reflex cameras, and more particularly to a focusing screen unit for a single lens reflex camera provided with an automatic sharpest focus detecting device.

2. Description of the Prior Art

To focus a single lens reflex (SLR) camera an operator normally looks through a viewfinder to observe an image of an object formed by an objective lens on a focusing screen. He then relies upon his own eyesight to determine whether the object is in focus. This visual and manual focusing procedure with the assistance of the focusing screen alone is, however, very troublesome, as is generally perceived by most beginning users of SLR cameras. A beginner requires considerable time and experience before being able consistently and accurately to adjust the objective lens to its optimum focus position. It is, therefore, exceedingly difficult for the average amateur to focus quickly without sacrificing the required level of accuracy. Thus, the photographer is obliged to proceed to take a picture although not always fully satisfied with the focus obtained.

Many attempts have been made to eliminate this inconvenience by providing a camera as equipped with an autofocus mechanism. Up to the present time, however, an autofocus mechanism has not found wide use in SLR cameras as compared with an automatic exposure control mechanism because of the following factors. First of all, the internal mechanisms of the camera require relatively large modifications for use thereof. The autofocus mechanism itself is so complicated in structure and so large in bulk and weight that it is in practice undesirable for the camera to be manufactured with such an additional mechanism. The production cost of the individual camera with autofocus capability is very high. Finally, the accuracy of a conventional autofocus mechanism for detection of the sharpest focus of the objective lens is not fully satisfactory.

To obtain the sharpest focus detecting device for a SLR camera in which the focusing of the objective lens corresponds to the degree of sharpness of an image of an object at the focal plane of the camera, the most expedient and simplest method involves an "electric eye" in lieu of the human eye. Specifically, it involves photoelectric element capable of responding to the variation in sharpness of the image for automatically detecting the point of sharpest focus. Essentially this photoelectric element must be arranged to receive at least part of a real image of the object formed by the objective lens or otherwise of a real image at least equivalent thereto, and the image receiving surface of the photoelectric element must be large enough to assure a sufficient accuracy despite variations in the photographic situations which may be encountered. However, the practical application of this method gives rise to a number problems with respect to the optical aspects of the arrangement and construction of the photoelectric element.

For example, the photoelectric element must be obtained from an image-forming light beam but positioned at a suitable location within the camera housing in cooperation with supplementary optical means arranged to direct a fraction of the image-forming light beam to the photoelectric element. Alternatively, an additional image forming lens mechanically linked with the objective lens may be used to form an image of the same object on the photoelectric element, while maintaining the sharpness of this image equivalent to that of the image formed on the imaging plane of the objective lens. Such a focus detecting optical system can not be provided without a relatively large modification of parts of the camera structure and is not favorable from the standpoint of an available spare space within the camera housing. What is worse is that, in the case of the first-mentioned arrangement of the photoelectric element, the image sharpness must be sensed at such low light levels or with such small images that the output signal of sufficiently high level is not available to assure good accuracy of detection of best focus, and, in the case of the second-mentioned arrangement, it is very difficult to achieve maintenance of optically precise coincidence in sharpness between the images formed by the objective lens and the additional image-forming lens throughout the entire focusing range. This introduces large errors into the focusing of the objective lens because the output signal of the photoelectric element does not correctly represent the degree of sharpness of an image at the focal plane of the camera. All of these problems may be considered as arising from the severe limitation on the position which the photoelectric element is intended to occupy.

In the field of SLR cameras, therefore, most photographers enjoy the fruits of the recently accelerated rates of exposure control automation, but are obliged to operate with old conventional visual and manual focusing procedures which rely solely upon the critical judgement of the naked eye. This conventional focusing procedure is associated with the above mentioned major inconveniences which have prejudiced the usefulness of automatic exposure control systems. Such systems were developed with the hope of obtaining easily operable snap photography and the like. Aside from such objective, it is highly desirable to enable the photographer who may be an average amateur user always to obtain obtain an optimum focus accurately and quickly because the focusing procedure is no longer hampered by his personal experience and insight. At the same time one wishes to preserve the essential parts of the internal camera structure and prevent changes which might result from the introduction of an automatic optimum focus detecting device into the SLR camera. Those changes might occur because of the fact that the availability of a position which the photosensitive element is intended to occupy is largely limited. The resultant complete SLR camera may be amenable to relatively low unit cost production techniques.

SUMMARY OF THE INVENTION

With the foregoing problems in mind, the present invention contemplates a SLR camera having an automatic sharp focus detecting capability by utilizing a so-called passive type or photoelectric transducing means capable of responding to the variation of sharpness of an image of an object formed by the objective lens of the camera. A general object of the invention is to provide a novel automatic optimum focus detecting optical unit for SLR cameras which preserves the internal camera structure and limits unduly large modifications which would otherwise be necessary because of the limited availability of a position which the aforesaid photoelectric transducing means is intended to occupy and which can be manufactured at a very low cost.

To achieve this object, according to the present invention, a focusing screen unit adapted to be attachable to and detachable from an SLR camera body is provided with transparent photoelectric transducing means having an image receiving surface arranged at in that of the surfaces of or in the vicinity of that of the surfaces of a focusing screen glass plate on which there is to be formed a real image equivalent in sharpness to that formed at the focal plane of the camera by means of an objective lens mounted on the camera, when the focusing screen unit is located at a predetermined position within the camera housing. By providing such a novel focusing screen unit having an "electric eye" for automatic detection of image sharpness it is possible to achieve an SLR camera having automatic focus detecting capability without causing any complicated modification of the internal camera structure despite to the limited availability of a position which the photoelectric transducing means is intended to occupy and at a low production cost.

The present invention also provides for a signal processing circuit responsive to an electrical output signal of the aforesaid photoelectric transducing means for producing an electrical output signal corresponding to the focusing condition of the objective lens in combination either with indicating means for indicating the point of sharpest focus which occurs during the focusing process of the objective lens or with driving means for driving the objective lens in automatic response to the output of the processing circuit. Both of the processing circuit and the indicating means may be positioned within the camera body separable from the focusing screen unit, but upon attachment of the latter to the camera body to cooperate with the photoelectric transducing means so that the visual focusing procedure is no longer hampered by the above mentioned inconveniences associated with the conventional one.

An object of the present invention concomitant with the foregoing object is to provide a novel focusing screen unit for SLR cameras which has not only an automatic focus detecting function but indicates the point of sharpest focus so that any average amateur user can always adjust the objective lens quickly and accurately to best focus without using his personal experience and insight. This overcomes all the disadvantages of the conventional visual and manual focusing procedures which depends to a great degree upon very troublesome judgements of the naked eye when using the prior art cameras and in particular SLR cameras.

To achieve this, according to the present invention, the focusing screen unit of the character described is provided in addition to the photoelectric transducing means with indicating means such as a LED (Light Emitting Diode) arranged to be energized when the focus is sharpest so that the operator need only stop the distance adjusting ring from further rotation. The ring would otherwise be operated, at best, to an interpolation between two bracketing conditions of visual focus as has been conventional for so long. With such a focusing screen unit, what the camera body must be provided only with an electrical circuit for controlling the indicating means on the basis of the electrical output of the transparent photoelectric transducing means.

Another object of the present invention concomitant with the foregoing two objects is to provide a novel focusing screen unit adapted for incorporation in any type of SLR camera while requiring almost no additional equipment therefor in the camera body. All that is necessary to impart into a conventional SLR camera an automatic focus detecting capability is only to substitute the focusing screen unit of the invention for the intrinsic or existing focusing screen of the camera.

To this end, the present invention contemplates the use of an integrated circuit chip for processing the output signal of the transparent photoelectric transducing means to produce an output which is applied to the indicating means. This circuit chip may be assembled with the focusing screen unit of the character described in connection with the second-named object to establish a complete automatic focus detecting system therein.

The last-mentioned focusing screen unit of the invention has great advantages. For example, when a SLR camera is to be assembled from its constitutional parts, it is very easy to put the focusing screen unit of the invention into place of the conventional focusing screen. In order for the present invention to be eminently suited to assist in the stream of systematization of SLR cameras which is in full flourish at the present time, it is preferable to construct the focusing screen unit in the interchangeable form. Particularly in application to the highly systematized types of SLR camera wherein not only a series of objective lenses but also a series of view finders and focusing screens are made interchangeable one with another. Therefore, the utility of the automatic focus detecting device of the present invention constitutes a remarkable advance in the art.

For this reason, the present invention will be described in connection with a number of embodiments all of which are directed to a focusing screen unit having at least two functions of sensing a variation in sharpness of the image and of indicating the attainment of a condition of sharp focus, and rendered interchangeable with any of the series of focusing screen unit of different function adapted for use with a common SLR camera body.

BRIEF DESCRIPTION OF THE DRAWINGS

The present invention with additional objects, features and advantages thereof will best be understood from the following description of the preferred embodiments when read in connection with the accompanying drawings wherein:

FIGS. 1 to 9 show a first embodiment of a focusing screen unit adapted to be attachable to and detachable from a SLR camera according to the present invention.

FIGS. 10 and 11 show a second embodiment of the focusing screen unit according to the invention with particularity in the arrangement and construction of that basic part which is changed from the first embodiment.

FIGS. 12 to 16 show a third embodiment of the focusing screen unit for a SLR camera.

DETAILED DESCRIPTION OF THE PREFERRED EMBODIMENTS

Figure 6:
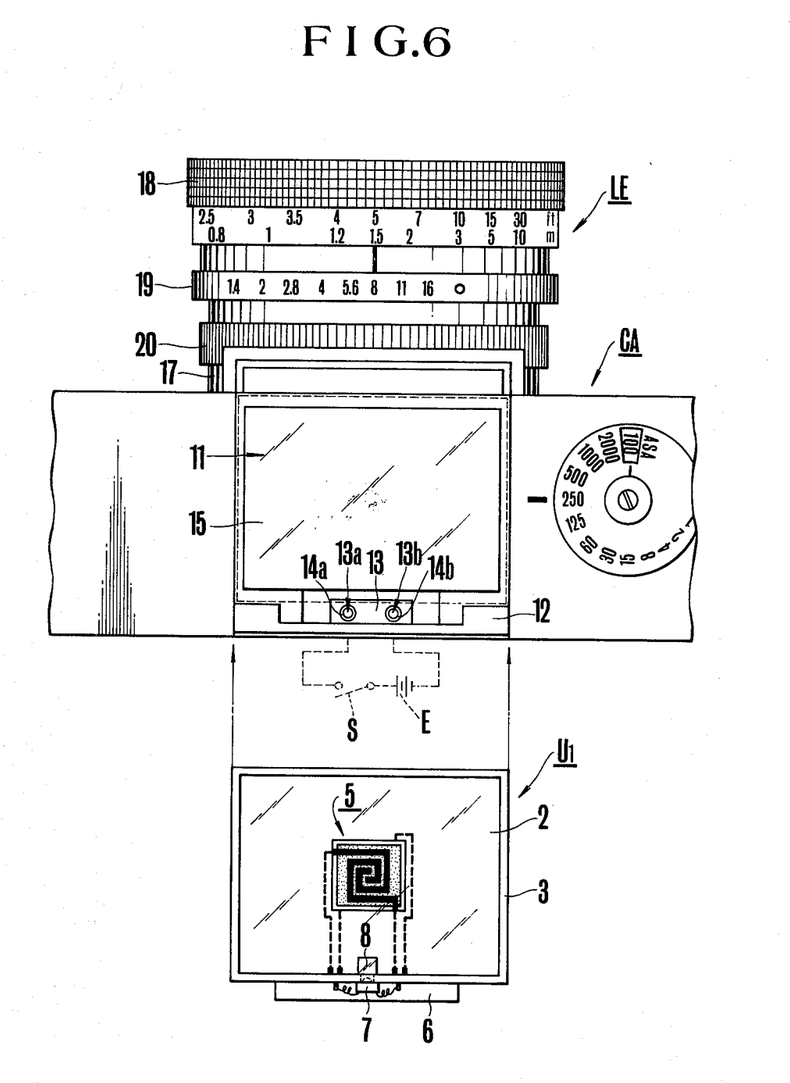
FIG. 6 is a fragmentary top view of a SLR camera with the focusing screen unit of FIGS. 1 to 5 shown as being about to be substituted for an exchangeable focusing screen of the camera.
Figure 7:
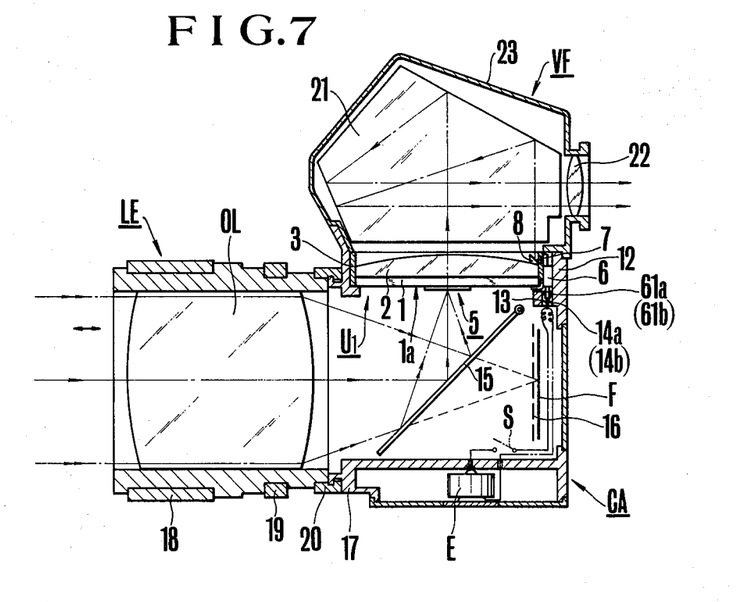
FIG. 7 is a sectional view of a complete SLR camera of FIG. 6 having incorporated therein the focusing screen unit of the present invention.

In FIGS. 1 to 9 a first focusing screen unit $U_1$ embodying the present invention is attachable to and detachable from a single lens reflex camera body as shown in FIGS. 6 and 7. The focusing screen unit includes a focusing screen glass plate 1 and a condenser lens 2 positioned above the plate 1 both fixedly secured in a support frame structure 3 by four fasteners 4. The plate 1 has a matted surface 1a outside a central smooth region 1c of square or rectangular area on the one of the sides of the plate 1 which is remote from the condenser lens 2 formed on the opposite side of the plate is a Fresnel lens 1b that collects the light rays scattered by the matted surface 1a and directed them to the condenser lens 2. Upon attachment of the unit $U_1$ to the camera body CA at a recessed portion 11 formed in a portion of the camera housing frame 12 shown in FIGS. 6 and 7, light entering the objective lens OL is reflected upwardly by a reflex mirror 15 onto the focusing screen glass plate 1. An image of an object area intended to be photographed is formed on the matted surface 1a while being maintained equivalent in sharpness to that which is to be formed at a focal plane F of the camera by the same objective lens OL.

Figure 1:
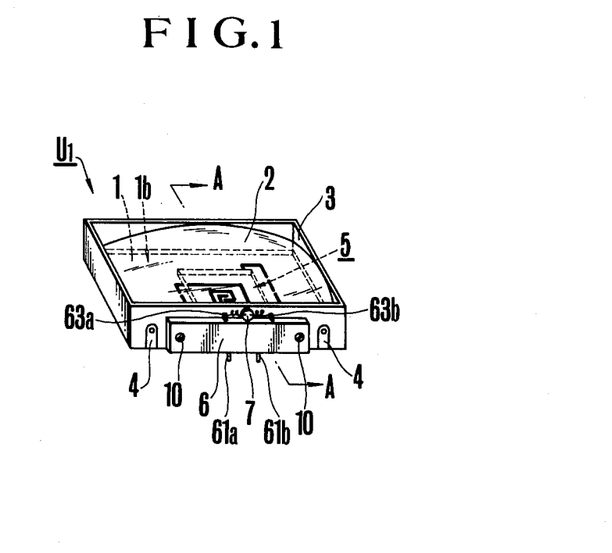
FIG. 1 is an upper perspective view of the focusing screen unit.
Figure 2:
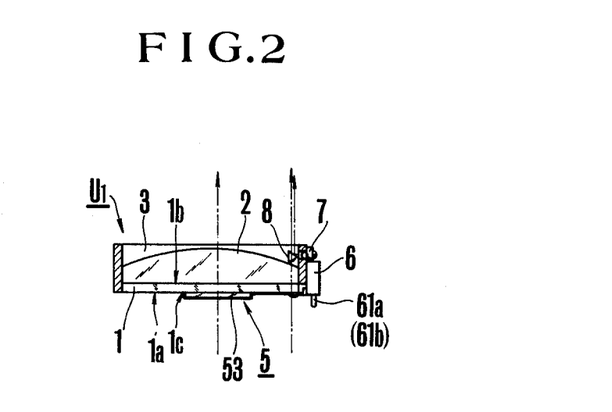
FIG. 2 is a sectional view taken along A—A line of FIG. 1.
Figure 3A:
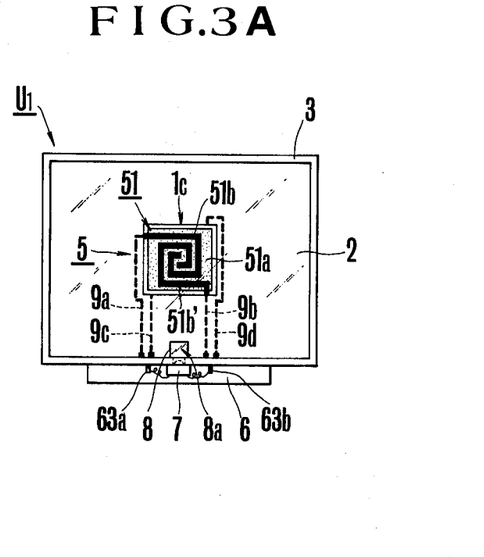
FIGS. 3A and 3B are top and bottom views of the unit of FIG. 1 respectively.
Figure 3B:
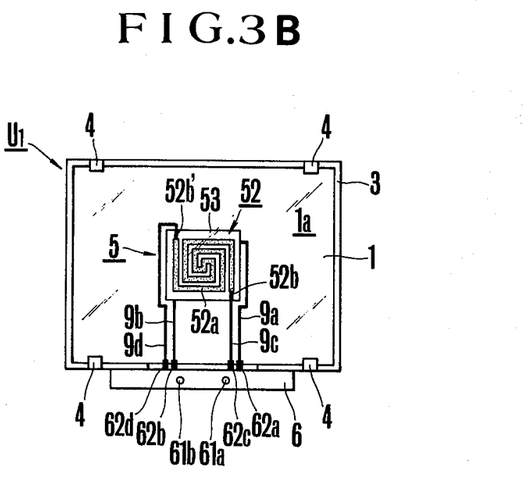
Figure 4A:
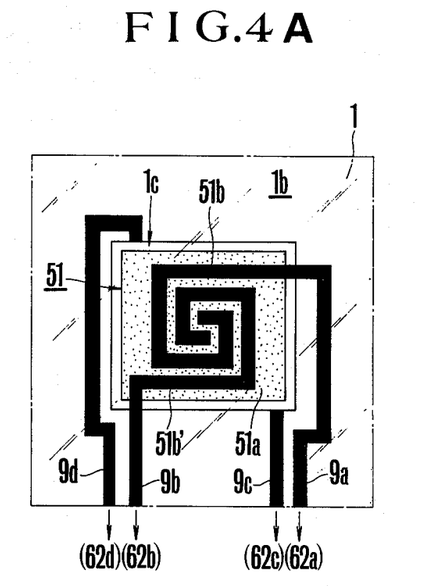
FIGS. 4A to 4C are top, bottom and sectional views respectively on greatly enlarged scales showing the details of the arrangement and construction of the transparent photoelectric transducing means of FIGS. 1 to 3.
Figure 4B:
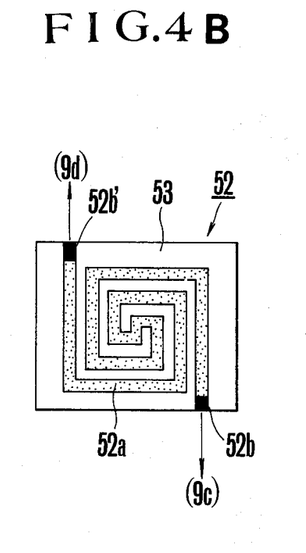
Figure 4C:
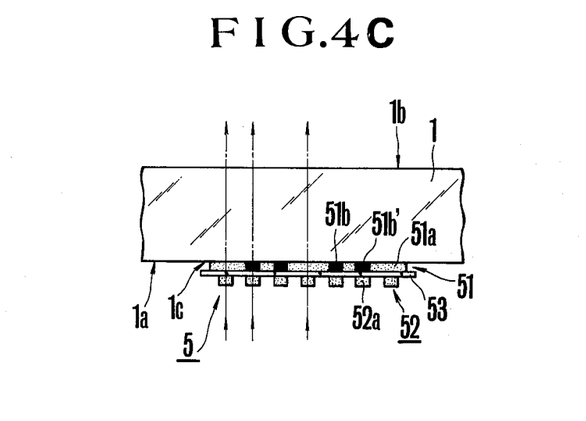

Positioned on the focusing screen glass plate 1 at the central smooth region 1c of the matted surface 1a is a transparent photoelectric transducing means 5 consisting of first and second elements 51 and 52 whose structural details and arrangement are shown in FIGS. 3A and 4A and FIGS. 3B and 4B respectively. The first transparent photo-electric transducer element 51 comprises a continuous transparent photo-sensitive layer 51a defining an image receiving surface and a pair of strip shaped transparent electrodes 51b and 51b' forming a set of bifilar spirals and contacting respective sides of the layer strip along the entire side lengths thereof. This first transducer element 51 is hereinafter referred to as "parallel type transducer". The second transparent photoelectric transducer element 52 is composed of a continuous transparent photo-sensitive layer 52a defining an image receiving surface and shaped and oriented to overlap the electrodes 51b and 51b'. The first or parallel type transducer 51 is stacked through a very thin transparent insulating plate 53 such as of glass upon the second transducer 52 in the direction in which a finder image-forming light beam passes therethrough as shown in FIG. 4C. A pair of transparent electrodes 52b and 52b' contact spaced portions of the layer 52a between which a current path is established along the entire length thereof. This second transducer element 52 is hereinafter referred to as "series type transducer". These electrodes 52b, 52b', 51b and 51b' are electrically connected by way of respective leads 9a to 9d to respective input terminals 62a to 62d of a signal processing circuit 6 as shown in FIGS. 3A and 3B.

When such first and second photo-sensitive layers 51a and 52a are made of photoconductive material such as cadmium sulfide (CdS), cadmium selenide (CdSe) or silicon, for example by evaporation coating techniques, it is important to keep their thicknesses as thin as possible, with uniformity over the entire surface areas so that the transmittance of the resultant layers are acceptable. On the other hand, the electrodes 51b to 52b' as well as their respective leads or transparent conductive paths 9a to 9d, may be made from a conductive material such as tin oxide sold commercially under the trade name "Nesa". The latter is applied in as small a thickness as possible uniformly for assuring a sufficiently high level of transmittance, and then solidified by means such as sintering. During this process, the first or parallel type transducer 51 is formed directly on the focusing screen glass plate at the central smooth region 1c. It is then possible to construct the electrodes 51b and 51b' along with the conductive pathes 9a to 9d at one time on the common side of plate 1. This affords the advantage of eliminating the step of later applying transparent conductive adhesive coatings, or very small patches of conductive material for electrical connecting at least the electrodes 51b and 51b' and the paths 9a and 9b. Alternatively, the parallel type transducer 51 and series type transducer 52 may be formed on the respective upper and lower surfaces of the single insulating glass plate 53 which is then brought into contact with the focusing screen glass plate 1 at the central smooth region 1c thereof while the electrodes 51b, 61b', 52b and 52b' are aligned with the respective pathes 9a to 9d, as will be understood from the drawing of FIG. 4C.

The output signal of such photoelectric transducing means 5 is processed by an electrical circuit described in detail in connection with FIGS. 8 and 9. This circuit is constructed in the form of an integrated circuit chip in an air-tight package 6 fixedly mounted on an external side wall of the support frame structure 3 by screw-fasteners 10. The latter may be replaced by a suitable adhesive agent. Connecting pins 61a and 61b from the packages are arranged to be inserted into respective plugs 13a and 13b (see FIG. 6) for electrical connection with respective power supply terminals 14a and 14b when the unit $U_1$ is attached to the camera body CA.

Figure 5:
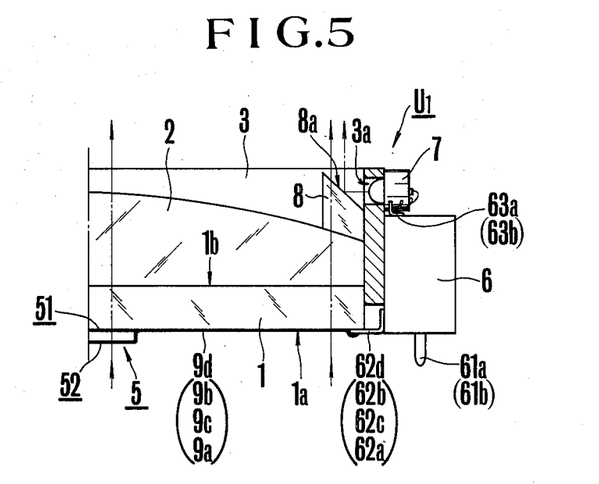
FIG. 5 is a fragmentary enlarged view of FIG. 2 showing details of the indicating means and the supplementary optical means therefor.

FIG. 5 shows an example of indicating means. Here an LED is connected to the output terminals 63a and 63b of the circuit 6 and energized when the objective lens OL is adjusted to sharply focus. The light of LED 7 is directed through a hole 3a is the wall of support frame structure 3 to a semi-reflection surface 8a of a prism 8 and therefrom reflected to the viewfinder optical system of the camera.

Figure 8:
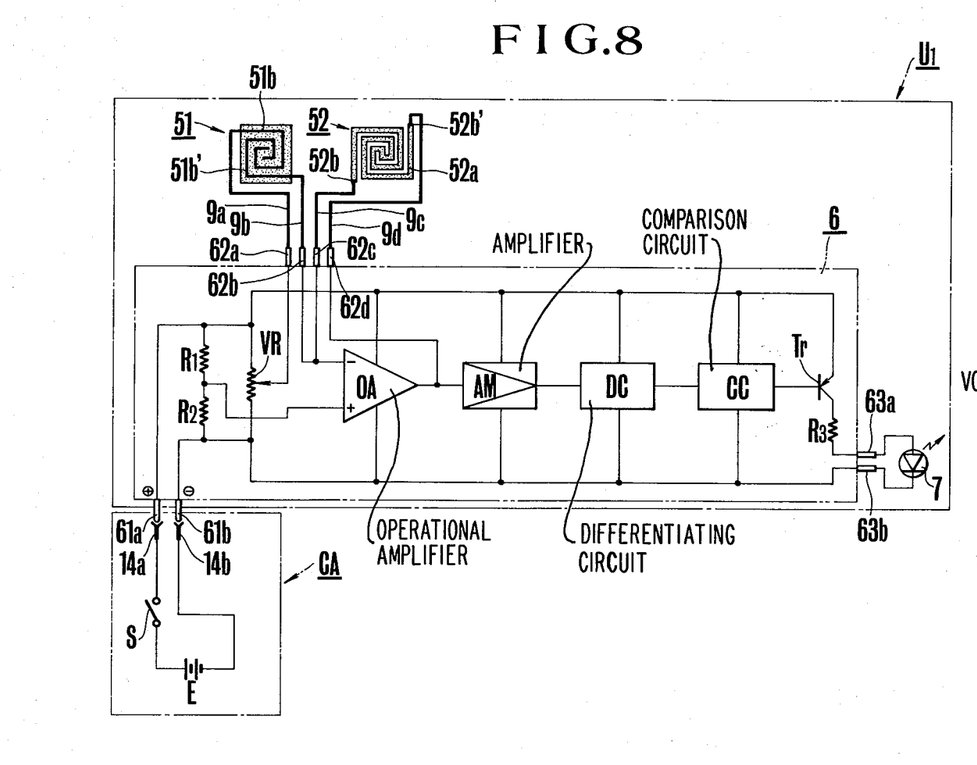
FIG. 8 is a schematic diagram, partly in block form, of an example of the circuitry of the focusing screen unit of FIGS. 1 to 7.
Figure 9:
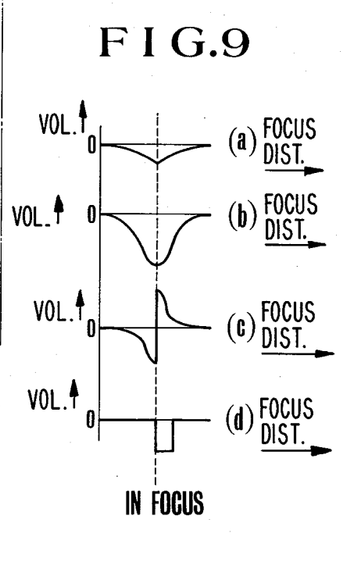
FIG. 9 is a voltage-versus-sharpness chart showing the waveforms at the various portions of the circuit of FIG. 8.

In FIG. 8, a circuit including the aforesaid circuit 6 enclosed in a dashed line block which in the current to an operational amplifier OA constitutes a so-called "push-pull circuit" together with the electrodes 51b, 51b', 52b and 52b' of the parallel type and series type transducers 51 and 52. An amplifier AM serves for amplifying the output of the operational amplifier OA. A differentiating circuit DC has an input connected to the output of the amplifier AM, and a comparing circuit CC serves for comparing the output of the differentiating circuit DC with a reference voltage, for example, zero volt. A switching transistor Tr has a base electrode connected to the output terminal of the comparing circuit CC, a collector electrode connected through a resistor R3 to the interconnection terminal 63a, and an emitter electrode connected through a positive bus to the positive power supply input terminal or connecting pin 61a. A negative power supply input terminal or connecting pin 61b is connected through a negative bus to the interconnection terminal 63b. Connected between the terminals 63a and 63b is the light emitting diode 7. As a voltage source for the first or parallel type transducer 51 there is provided a variable resistor VR connected between the positive and negative buses and having a slidable tap connected through the interconnection terminal 62a and lead 9a to the electrode 51b. The electrode 51b' is connected through the lead 9b and interconnection terminal 62b to the inversion input terminal (−) of the operational amplifier OA, while the non-inversion input terminal (+) of the operational amplifier OA is connected to a point on connection between series connected resistors R1 and R2 of equal resistance values to each other. The resistors R1 and R2 are connected between the positive and negative buses. The second or series type transducer 52 is connected in the feedback network of the operational amplifier OA through the interconnection terminals 62c and 62d and leads 9c and 9d. The circuit of FIG. 8 further includes an electrical power source or battery E having a positive electrode connected through a normally open switch S to the output terminal 14a positioned in the plug 13a and having a negative electrode connected to the output terminal 14b positioned in the plug 13b, these parts E, 14a, 14b and S being provided in the camera body CA.

In connection with the circuit arrangement of the parallel type and the series type transducers 51 and 52 it should be explained here that as the sharpness of the image formed on the transducing means 5 is varied, an electrical output signal commensurate with the degree of sharpness will be generated based on the following principles. As is known in the art, there exist photoelectric transducers of the so-called parallel type in which a strip shaped photo-sensitive layer contacts a pair of electrodes extending along the respective longer sides of the layer. There also exist the so-called series type in which electrodes contact a strip shaped photo-sensitive layer at the respective shorter sides of the layer. The characteristics of these two types differ with respect to the response to a variation in sharpness of the image.

In other words, at first, the resistance, rs, of the series type transducer is increased with increases in the degree of image sharpness, and reaches a maximum at the point of sharpest image independently of what value is taken by an illuminance exponent, e, indicative of the linearity characteristics of a material from which the photo-sensitive layer is made up. This does not hold true for the parallel type transducer when $e = 1$ or when e exceeds unity. Although, when e is less than unity, the resistance, rp, of the parallel type transducer is increased with increase in the degree of image sharpness, reaching a maximum at the point of sharpest image. Where $e = 1$, the resistance, rp, is unaffected by changes in the image sharpness. When e exceeds unity, the case where e is less than unity is reversed so that the resistance, rp is decreased as the image sharpness is increased, and a minimum resistance is reached when the image sharpness is at maximum. It follows that the simultaneous use of the series type transducer and the parallel type transducer having a photo-sensitive layer made from a material whose illuminance exponent, e, exceeds unity provides a combined output signal in terms of difference or ratio. This makes it possible to cause a change of the combined output quite abruptly at the point of sharp focus when focusing the objective lens OL.

According to the embodiment of the invention, as has been described above, the circuit 6 contains an operational amplifier OA with the parallel type transducer 51 connected to its input terminal and at its feedback with the series type transducer 52 connected as a feedback. With this circuit arrangement, as the outputs of the transducers 51 and 52 are varied, a single electrical output signal with a magnitude proportional to the ratio of the resistance, rs, of the first transducer 51 to the resistance, rp, of the second transducer 52, or rs/rp will result from the operational amplifier OA. In order that this output signal is made commensurable the focus, it is required that the two transducers 51 and 52 receives images from like portions of the object. This constitutes one reason why the strip shape photo-sensitive layers 51a and 52a of the individual transducers 51 and 52 are bifilar-spirally shaped.

The above described focusing screen unit $U_1$ can be substituted in the SLR camera body CA and rendered exchangeable with the intrinsic focusing screen in the manner explained in FIGS. 6 and 7. The SLR camera body CA is assumed to carry each of the individual exchangeable members including the objective lens mount LE and the viewfinder VF. In FIG. 6, the camera body CA is shown without the viewfinder VF and the intrinsic focusing screen though the latter is indicated by dashed lines. A recessed portion 11 is formed within the camera housing frame 12 to serve as a mount capable of receiving not only each individual interchangeable focusing screen but the focusing screen unit $U_1$ of the invention. During the set up process, the focusing screen unit $U_1$ is held vertical to the recessed portion 11 while the connecting pins 61a and 61b of unit $U_1$ are aligned with the respective plug holes 13a and 13b of an insulating plate 13 buried in the camera housing frame 12. At the termination of the setting up process, the connecting pins 61a and 61b are in electrical contact with the respective connecting terminals 14a and 14b. A tiltable reflex mirror of known construction is indicated at 15. The lens mount LE has a focusing ring 17, a diaphragm ring 18 and a clamping ring 19 for fixedly secured engagement of the lens mount LE to the camera body CA at the lens mount 16 thereof.

FIG. 7 shows a complete SLR camera having incorporated therein the focusing screen unit $U_1$ of the invention at a predetermined location such that the lower or matted surface of the screen glass plate 1 is exactly conjugate to the film plane F, and therefore that the photoelectric transducing means 5 is positioned in the vicinity of the image plane at a central area region thereof. With this camera it is possible to detect a sharpest focus condition of the objective lens accurately and quickly while looking through the viewfinder VF. The viewfinder VF which is conventional is positioned above the unit $U_1$ and includes a penta prism 21, and an eye piece lens 22, these parts 21 and 22 being positioned in a casing 23 to enable the observer from the outside of the camera not only to view the object image formed on the screen glass plate 1 but also to be aware if a condition of sharp focus is attained. The the light emitting from the indicating means 7 is reflected from the semi-reflection surface 8a of the prism 8 to the penta prism 21.

The visual and manual focusing procedure of the SLR camera with the focusing screen unit $U_1$ of the invention substituted for the intrinsic focusing screen will next be explained by particular reference to FIGS. 7 to 9. After an unillustrated shown control knob is operated to close the power switch S, the camera is aligned with an object which the operator wishes to photograph by the user looking through the viewfinder VF. This alignment process of the camera to the object is performed by examining the relative position of the object area to the entire field of view finder with the simultaneous careful observation of arrangement of the various parts of the object. For this purpose, the photoelectric transducing means 5 is made sufficiently transparent not to introduce an objectionable influence into the observation and examination of the image formed on the matted surface 1a of the plate 1.

Assuming that the object area intended to be photographed is located at an intermediate distance from the camera, when the focusing ring 18 is operated to focus, for example, from infinity to close up, the image on the matted surface (image receiving surface) 1a of plate 1 becomes progressively sharper and results in progressively smaller resistances of the parallel type transducer 51 with a simultaneous progressive increases in the resistance of the series type transducer 52. Responsive to the output signals of the both transducers 51 and 52, the operational amplifier OA in the electrical circuit 6 produces an output voltage capable of reaching a minimum level at the point of sharpest focus, as shown at (a) in FIG. 9. It is to be noted again that the output of the operational amplifier OA is varied as a function of $rs/rp$. This output after amplification by amplifier AM as in FIG. 9 at (b) is applied to the differentiating circuit DC. When the output of amplifier AM passes through the minimum, in other words, the point at which the degree of sharpness of the image formed on the image receiving surface 1a of the focusing screen glass 1 reaches the maximum level, the output of the differentiating circuit DC is instantaneously changed in polarity from minus to plus as shown in FIG. 9 at (c). As the reference voltage of the comparing circuit CC is adjusted to zero, upon occurrence of the inversion of polarity of the output of the differentiating circuit DC from minus to plus, the comparing circuit CC produces a rectangular waveform as shown at (d) in FIG. 9. This turns on the transistor Tr to energize the light emitting diode (LED) 7 which indicates that the condition of sharpest focus of the objective lens OL has been attained. Consequently, as soon as the user looking through the viewfinder is made aware of the occurrence of light from the diode 7, he may stop operation of the focusing ring 18 and that proper adjustment of the objective lens to sharp focus has been automatically accomplished. Thereafter, a an unillustrated release button may be depressed to initiate an exposure of the film F for an image of the object at sharpest focus.

With the help of the focusing screen unit $U_1$ of the invention, the SLR camera can effect focusing adjustment very quickly and accurately.

Figure 10:
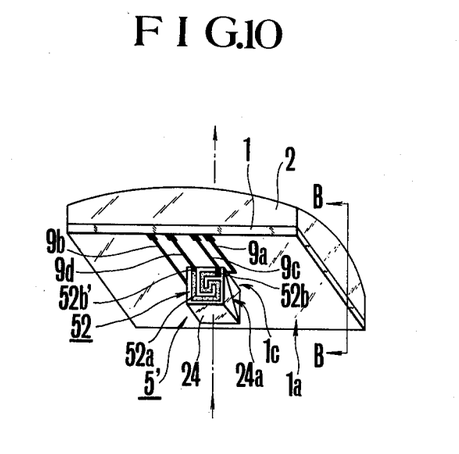
FIG. 10 is a lower perspective view of that basic part.
Figure 11:
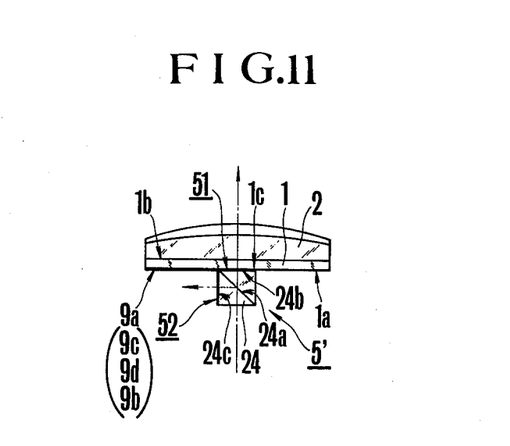
FIG. 11 is a sectional view taken along B-B line of FIG. 10.

FIGS. 10 and 11 show the second embodiment of the invention which is different from the first embodiment in that the substantial axial separation between the image receiving surfaces defined by the photo-sensitive layers of the first and second transducers resulting from the use of the spacer, namely, the very thin insulating glass plate 53 is reduced to zero by employing a beam splitter instead of the plate 53. The same numerals are employed in those figures to denote parts of the second embodiment which remain substantially unchanged from the first embodiment illustrated in FIGS. 1 to 5. Those parts of the second embodiment which do not serve to clarify the additional design features of the invention are omitted for illustration purposes.

The beam splitter which is indicated at 24 is constructed in the form of a cube having two diagonal cube sections with their diagonal faces serving as a semi-reflection surface 24a. The parallel type and the series type transducers 51 and 52 are arranged on the respective faces 24b and 24c of the cube 24 conjugate to each other with respect to the semi-reflection surface 24a and are so oriented that when the cube 24 is positioned on the focusing screen glass plate 1 at the central smooth region 1a in a manner to hold the parallel type transducer 51 between the cube 24 and plate 1, the electrodes 51b, 51b', 52b and 52b' are connected to the respective conductive paths 9a to 9d previously formed on the matted surface 1a of the plate 1. The parallel type transducer 51 though has been described above as initially formed on the cube face 24b may be otherwise formed directly on the smooth region 1a in the matted surface 1a.

In the second embodiment of the invention, upon attachment of the focusing screen unit of such character to the SLR camera body CA of FIGS. 6 and 7, it is proven that each of the transducers 51 and 52 substnatially assume a common image plane of the objective lens as the parallel type transducer 51 receives light transmitted through the semi-reflection surface 24a, while the series type transducer 52 receives light reflected from the same semi-reflection surface 24a.

By reference to FIGS. 12 - 16, the third embodiment of the invention will next be explained. The same numerals are employed in these figures to denote parts of that embodiment which remain substantially unchanged from the first and second embodiments. In the figures, at first, the focusing screen unit is generally indicated at $U_2$ in which a parallel type transducer 151 and a series type transducer 152 are both formed directly on the screen glass 1 by utilizing the smooth region 1c of the matted surface 1a thereof. The method of making these transducers 151 and 152 may be exactly the same as that described in connection of the first embodiment. In particularity with this or third embodiment, however, the electrodes 151b, 151b', 152b and 152b' of the transducers 151 and 152 can be simultaneously applied together with each other and also with their respective conductive paths 9a to 9d because of the far more simplified structure compared with the first and second embodiments.

Figures 13, 14:
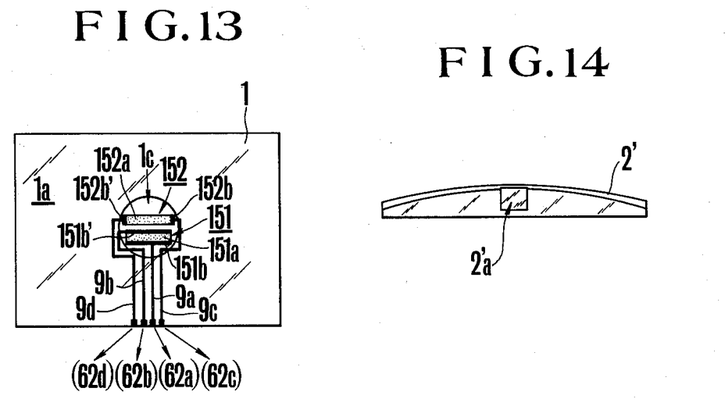
FIG. 13 is a plan view of a focusing screen glass plate with photoelectric transducing means positioned thereon and constituting part of the unit of FIG. 12.
FIG. 14 is a side elevational view of a condenser lens having a cutout formed in a portion thereof and serving as a mirror for an indicating lamp.
Figure 15:
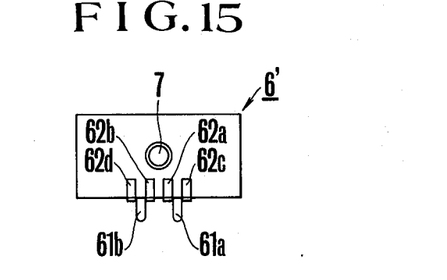
FIG. 15 is a side elevational view of an integrated circuit chip container mounted within a frame structure of the unit.
Figure 16A:
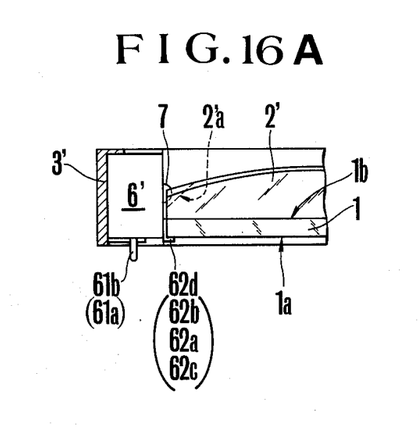
FIGS. 16A and 16B are fragmentary sectional views on enlarged scales showing the details of indicating means of the invention.
Figure 16B:
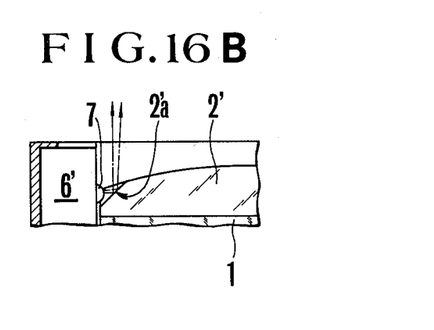

The signal processing circuit 6 and LED 7 as the indicating means similar to those of the first embodiment are employed as mounted in a common package 6'. The condenser lens 2' is provided with a small mirrored surface 2'a formed in a portion thereof and inclined to direct the light of LED 7 into the view finder optical system as shown in FIGS. 14 and 16. In FIG. 15 there is shown the details of arrangement of the LED 7 in the package 6'.

Figures 12A, 12B:
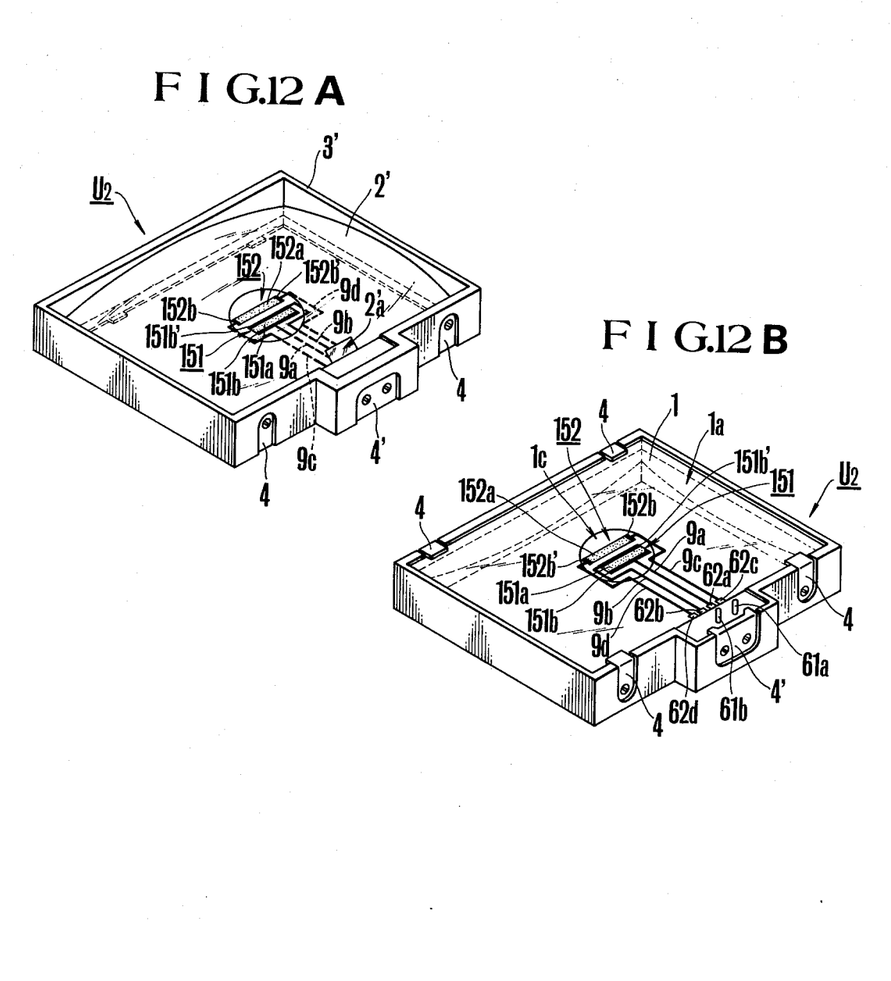
FIGS. 12A and 12B are upper and lower perspective views of the focusing unit.
Figure 17:
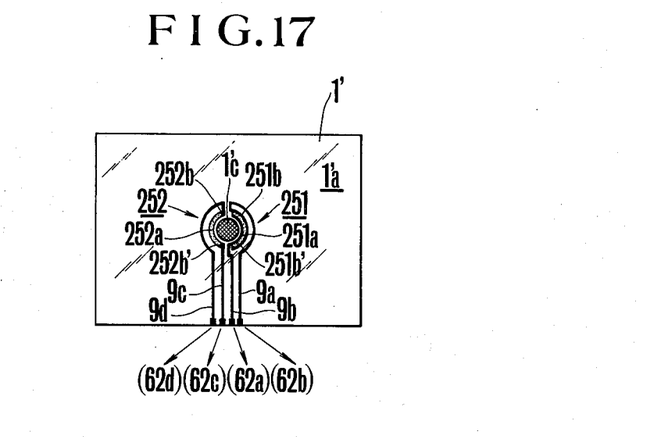
FIG. 17 is a plan view of a focusing screen glass plate with another example of configuration of the transducing means usuable in the focusing screen unit of the invention.

FIG. 17 shows another example of modification of the first and second transducers with respect to the shape and arrangement of their transparent photo-sensitive layers as adapted for use with a focusing screen glass plate 1' having a micro-split prism surface formed in a central portion 1c' thereof. Whilst the photo-sensitive layers 151a and 152a of FIGS. 12 and 13 are rectangular in shape and arranged adjacent to each other in parallelism within the central portion 1c of the focusing screen glass plate 1, the parallel type transducer 251 and series type transducer 252 are constructed from respective transparent strip shape photo-sensitive layers 251a and 252a of semi-circular configuration concentric to the central circular region 1'c of micro-split prism surface and positioned adjacent thereto. The layer 251a is in contact with a pair of transparent electrodes 251b and 251b' along the longer sides thereof. The layer 252 is in contact with a pair of transparent electrodes 252b and 252b' at the ends thereof.

Finally, another example of the signal processing circuit will next be explained by reference to FIGS. 18 and 19 wherein though there are shown as cooperating with the photoelectric transducing means of bifilar spiral configuration, the otherwise configured transducing means 151 and 152; 251 and 252 may be substituted therefor without modification of the circuit design. The same numerals are employed in these figures to denote parts of that example which remain unchanged in structure and function from the first embodiment shown in FIG. 8.

Figure 18:
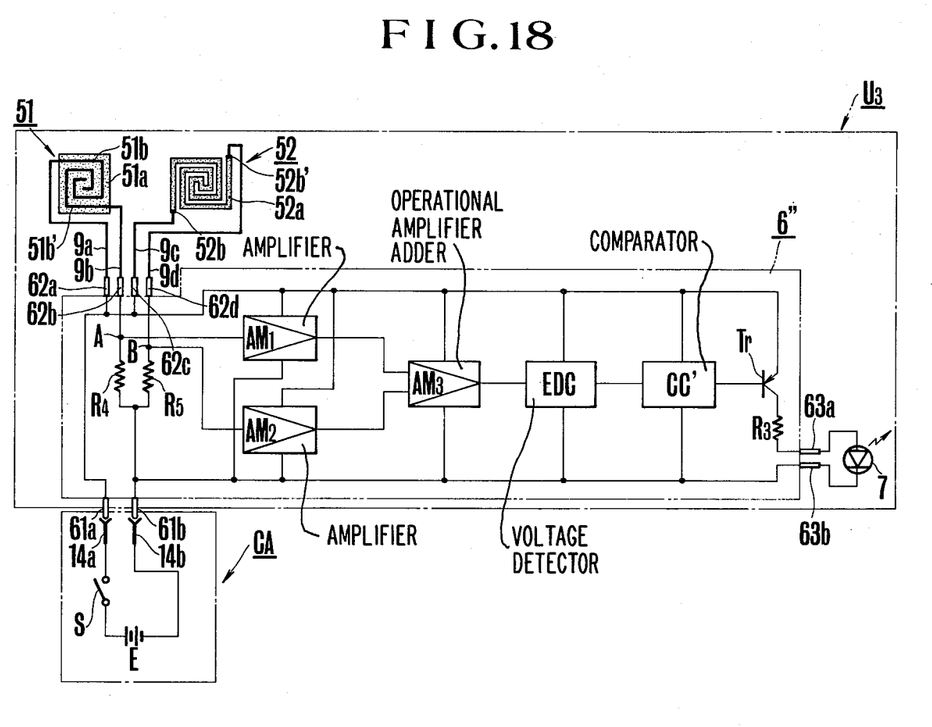
FIG. 18 is a schematic diagram, partly in block form, of another example of the circuitry of the focusing screen unit of the invention.
Figure 19:
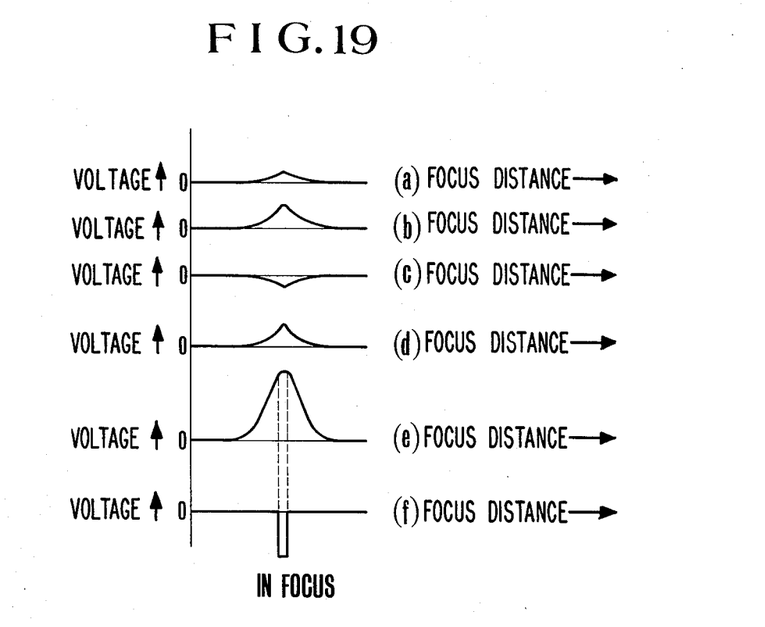
FIG. 19 is a voltage-versus-sharpness chart showing the waveforms at the various portions of the circuit of FIG. 18.

In FIG. 18, an electrical circuit for processing the outputs of the above mentioned transducers 51 and 52 to produce electrical signal corresponding to the focusing condition of the objective lens is indicated at 6", and comprises a first amplifier AM1 having a non-inversion input terminal connected to a point A on connection between the parallel type transducer 51 and a resistor R4, a second amplifier AM2 having an inversion input terminal connected to a point B on connection between the series type transducer 52 and a resistor R5, an adder or operational amplifier AM3 having two input terminals connected to the respective outputs of the first and second amplifiers AM1 and AM2, a peak voltage detector EDC for detecting a peak output voltage of the adder AM3, a comparator CC' responsive to the output of detector EDC for producing a pulse signal, and a switching transistor Tr for controlling actuation of the indicating means 7 in accordance with the output of the comparator CC'.

The operation of the circuit $U_3$ of FIG. 18 with the camera body CA of FIGS. 6 and 7 is as follows. As the degree of sharpness of the image on the transducers 51 and 52 is varied by moving the focusing ring of the objective lens mount LM, the resistances of the transducers 51 and 52 are varied in the opposite senses to each other. The voltage variations at point A and at the output of AM1 are shown as plotted against the image sharpness on lines (a) and (b) of FIG. 19, while the voltage variations at point B and at the output of AM2 are shown on lines (c) and (d) respectively. During the focusing process of the objective lens OL, when a condition of sharpest focus is attained, an added peak voltage is obtained from the adder AM3 and converted to a pulse signal shown on line (f) by the combination of the detector EDC and comparator CC'. This pulse signal is applied to the base electrode of transistor Tr so that the indicating means is energized.

The present invention has been described in connection with the preferred embodiments in which the number of transducer elements is two, that is, the combination of a parallel type photoelectric transducer (51; 151; 251) and a series type photoelectric transducer (52, 152; 252). It is of course possible to omit any one of them. In this case, the necessary modification of the electrical circuitry is very simple. For example, in FIG. 8, the selected photoelectric transducer of either type is connected brought into connection with the input terminal of the operational amplifier OA, while the feedback network of OA is substituted by a suitable circuit element such as a resistor. In the case of the circuit of FIG. 18, one of the first and second amplifiers AM1 and AM2 may be omitted, together with the adder AM3. Further, through the electrical circuit and the indicating means responsive to the output of the circuit for indicating the focusing condition of the objective lens are shown as assembled along with the photoelectric transducing means in unison within a common focusing screen unit, they may be separated from the transducing means and mounted in the camera body CA. This will, however, give a disadvantage.

The present invention is not limited to the mere detection of a condition of sharpest focus though all of the above described embodiments are directed thereto, but can be employed in a fully automatic focusing mechanism having a driving motor for driving the objective lens along the optical axis. The construction of the focusing screen unit of the invention is applicable even to exposure measuring devices with modification in particular of the electrical circuitry.

What is claimed is:

1. A focusing screen assembly for a single lens reflex camera which is equipped with a photo-taking lens means, said lens means being adjustable along an optical axis for focusing an image of an object on a predetermined film plane of the camera, said assembly comprising;
    (a) a focusing screen means having an image receiving surface adapted to receive the object image formed by said photo-taking lens means at a position conjugate to that of said predetermined film plane; and
    (b) light transmissive photoelectric transducing means arranged substantially on said image receiving surface of the screen means and capable of producing an electrical output substantially corresponding to the sharpness of the image on said image receiving surface as the image sharpness is varied by the axial adjustment of the lens means, whereby it is made possible to detect the focusing condition of the lens means to the object by the electrical output of the transducing means.

2. A focusing screen assembly according to claim 1, further including;

electrical circuit means for producing an electrical signal corresponding to the focusing condition of said photo-taking lens means on the basis of the electrical output of said photoelectric transducing means, said circuit means being electrically connected with the transducing means and having connecting terminal means adapted for electrical connection with the camera body;

light transmissive conductive paths adapted for electrically connecting said transducing means with said circuit means, said conductive paths being formed on said image receiving surface of the screen means;

said circuit means being electrically connected with said transducing means through said conductive paths; and frame means for supporting said circuit means together with said screen means in unison.

3. A focusing screen assembly according to claim 2, further comprising;

indicating means for indicating the focusing condition of said photo-taking lens means in response to the electrical signal produced by said electrical circuit means, said indicating means being electrically connected with the circuit means.

4. A focusing screen assembly according to claim 3, further comprising;

optical means adapted for conducting the indicating information generated by said indicating means to a view finder of the camera.

5. A focusing screen assembly according to claim 1, further comprising;

indicating means adapted for indicating the focusing condition of said photo-taking lens means on the basis of the electrical output of said photoelectric transducing means.

6. A focusing screen assembly according to claim 5, further comprising;

optical means adapted for conducting the indicating information generated by said indicating means to a view finder of the camera.

7. A focusing screen assembly according to claim 1, wherein said photoelectric transducing means includes a first and a second light transmissive photoelectric transducers electrically insulated from each other.

8. A focusing screen assembly according to claim 7, wherein at least one of said first and said second transducers is formed directly on the image receiving surface of the screen means.

9. A focusing screen assembly according to claim 8, wherein said first and second transducers have respective characteristics such that their outputs are varied in the opposite senses to each other as the image sharpness is varied.

10. A focusing screen assembly according to claim 8, wherein said first photoelectric transducer is constructed from a first strip shape light transmissive photo-sensitive layer contacting a pair of light transmissive electrodes along the longer sides of the layer, while said second photoelectric transducer is constructed from a second strip shape light transmissive photo-sensitive layer contacting a pair of light transmissive electrodes at the shorter sides of the layer.

11. A focusing screen assembly according to claim 10, wherein said first pair of electrodes in said first transducer and said second photo-sensitive layer in said second transducer each are configured to a bifilar spiral.

12. A focusing screen assembly according to claim 11, wherein said photoelectric transducing means further includes:

a very thin light transmissive insulating plate;

said first and second photoelectric transducers being arranged through said insulating plate in overlapping relation to each other.

13. An exchangeable focusing screen unit for use with a single lens reflex camera body which is equipped with a photo-taking lens means, said lens means being adjustable along an optical axis for focusing an image of an object on a predetermined film plane in the camera body, said screen unit comprising;

(a) a holding frame means detachable from the camera body;

(b) a focusing screen glass having an image receiving surface adapted to receive the object image formed by said photo-taking lens means at a position conjugate to that of said predetermined film plane and supported by said frame means; and (c) light transmissive photoelectric transducing means arranged substantially on said image receiving surface of the screen glass and capable of producing an electrical output substantially corresponding to the sharpness of the image on said image receiving surface as the image sharpness is varied by the axial adjustment of the lens means, whereby it is made possible to detect the focusing condition of the lens means to the object by the electrical output of the transducing means.

14. A focusing screen unit according to claim 13, further comprising;

electrical circuit means for producing an electrical signal corresponding to the focusing condition of said photo-taking lens means on the basis of the electrical output of said photoelectric transducing means; said circuit means being supported with said focusing screen glass in unison by said frame means and having connecting terminal means adapted for electrical connection with the camera body; and light transmissive conductive paths adapted for electrically connecting said transducing means with said circuit means, said conductive paths being formed on said image receiving surface of the screen glass;

said circuit means being electrically connected with said transducing means through said conductive paths.

15. A focusing screen unit according to claim 14, further comprising;

indicating means for indicating the focusing condition of said photo-taking lens means in response to the electrical signal produced by said electrical circuit means, said indicating means being electrically connected with the circuit means.

16. A focusing screen unit according to claim 15, further comprising;

optical means adapted for conducting the indicating information generated by said indicating means to a view finder of the camera.

17. A focusing screen unit according to claim 16, wherein said photoelectric transducing means includes a first and a second transparent photoelectric transducers electrically insulated from each other.

18. A focusing screen unit according to claim 17, wherein at least one of said first and said second transducers is formed directly on the image receiving surface of the screen glass.

19. A focusing screen unit according to claim 18, wherein said first photoelectric transducer is constructed from a first strip shape transparent photo-sensitive layer contacting a pair of transparent electrodes along the longer sides of the layer, while said second photoelectric transducer is constructed from a second strip shape transparent photo-sensitive layer contacting a pair of transparent electrodes at the shorter sides of the layer.

20. A focusing screen unit according to claim 19, wherein said first pair of electrodes in said first transducer and said second photo-sensitive layer in said second transducer each are configured to a bifilar spiral.

21. A focusing screen unit according to claim 20, wherein said photoelectric transducing means further includes;
a very thin light transmissive insulating plate;
said first and second photoelectric transducers being arranged through said insulating plate in overlapping relation to each other.

22. A focusing screen unit according to claim 21, wherein said first and second transducers have respective characteristics such that their outputs are varied in the opposite senses to each other as the image sharpness is varied.

23. A single lens reflex camera comprising;
(a) a photo-taking lens means adjustable along an optical axis for focusing an image of an object on a predetermined film plane;
(b) a movable reflecting mirror for projecting the object image to be formed on said film plane by the lens means onto a conjugate surface to the film plane, said reflecting mirror being arranged behind said lens means;
(c) a focusing screen glass having an image receiving surface adapted to receive the object image formed by said lens means within the surface conjugate to the film plane, said screen glass being arranged so that said image receiving surface coincides with said conjugate surface; and
(d) light transmissive photoelectric transducing means arranged substantially on said image receiving surface of the screen glass and capable of producing an electrical output substantially corresponding to the sharpness of the image on said image receiving surface as the image sharpness is varied by axial adjustment of the lens means,
whereby it is made possible to detect the focusing condition of the lens means to the object by the electrical output of the transducing means.

24. A single lens reflex camera according to claim 23, further comprising;
a holding frame means for holding said focusing screen glass at an adjusted position;
electrical circuit means for producing an electrical signal corresponding to the focusing condition of said photo-taking lens means on the basis of the electrical output of said photoelectric transducing means, said circuit means being held with said screen glass in unison by said frame means and having connecting terminal means adapted for electrical connection with the camera body; and
light transmissive conductive paths adapted for electrically connecting said transducing means with said circuit means, said conductive paths being formed on said image receiving surface of the screen glass;
said circuit means being electrically connected with said transducing means through said conductive paths.

25. A single lens reflex camera according to claim 24, further comprising;
indicating means for indicating the focusing condition of said photo-taking lens means in response to the electrical signal produced by said electrical circuit means, said indicating means being electrically connected with the circuit means and fixedly supported by said frame means.

26. A single lens reflex camera according to claim 25, further comprising;
view finder optical means adapted for viewing the object image formed on said image receiving surface of the screen glass from the outside of the camera; and
an auxiliary optical means adapted for conducting the indicating information generated by said indicating means to said view finder optical means, said auxiliary optical means being fixedly supported by said frame means.

27. A single lens reflex camera according to claim 26, wherein said photoelectric transducing means includes a first and a second transparent photoelectric transducers electrically insulated from each other.

28. A single lens reflex camera according to claim 27, wherein at least one of said first and said second transducers is formed directly on the image receiving surface of the screen glass.

29. A single lens reflex camera according to claim 28, wherein said first photoelectric transducer is constructed from a first strip shape light transmissive photo-sensitive layer contacting a pair of light transmissive electrodes along the longer sides of the layer, while said second photoelectric transducer is constructed from a second strip shape light transmissive photo-sensitive layer contacting a pair of light transmissive electrodes at the shorter sides of the layer.

30. A single lens reflex camera according to claim 29, wherein said first pair of electrodes in said first transducer and said second photo-sensitive layer in said second transducer each are configured to a bifilar spiral.

31. A single lens reflex camera according to claim 30, wherein said photoelectric transducing means further includes;
a very thin light transmissive insulating plate;
said first and second photoelectric transducers being arranged through said insulating plate in overlapping relation to each other.

32. A single lens reflex camera according to claim 31, wherein said first and second transducers have respective characteristics such that their outputs are varied in the opposite senses to each other as the image sharpness is varied.

* * * * *